UNITED STATES PATENT OFFICE.

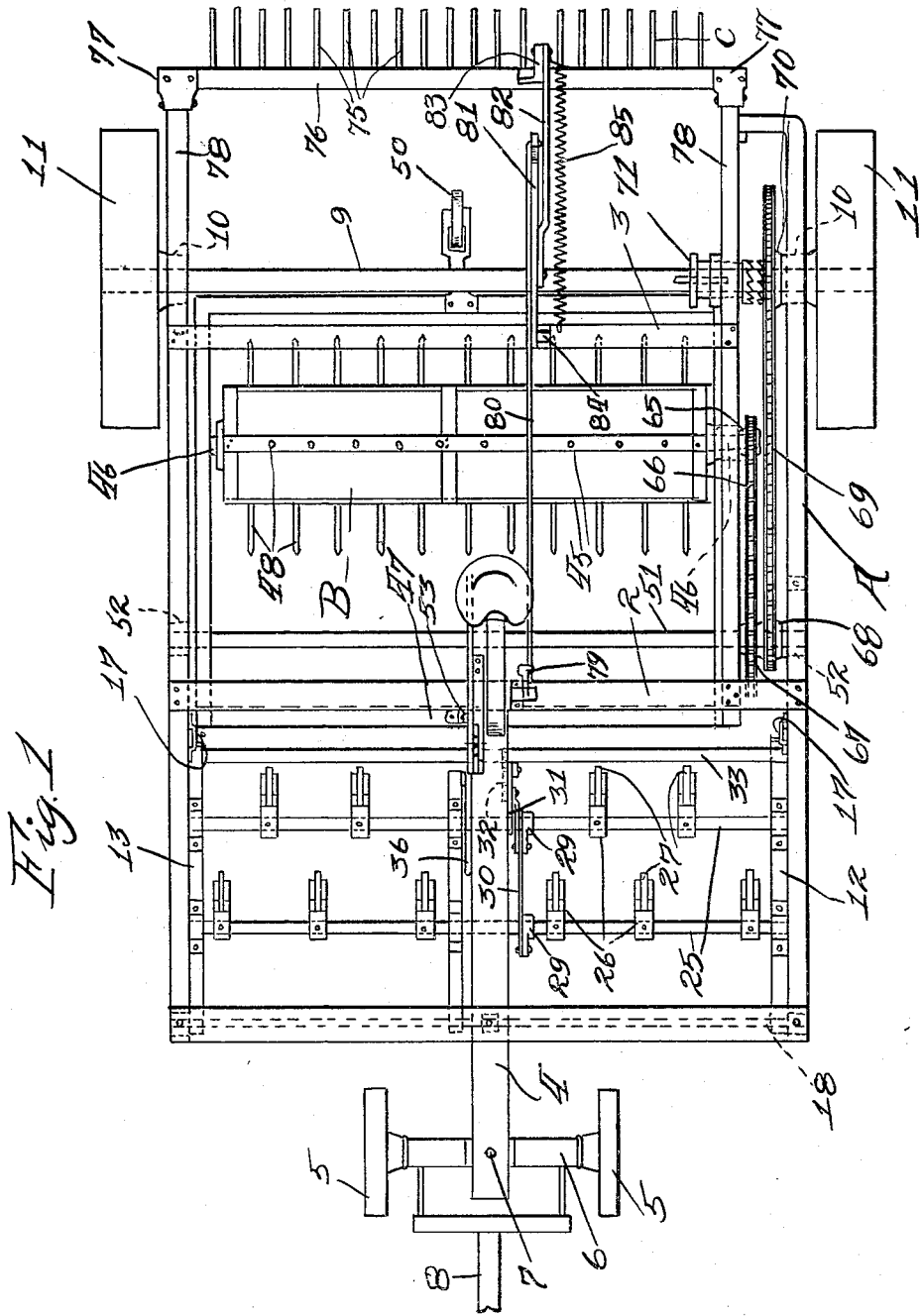

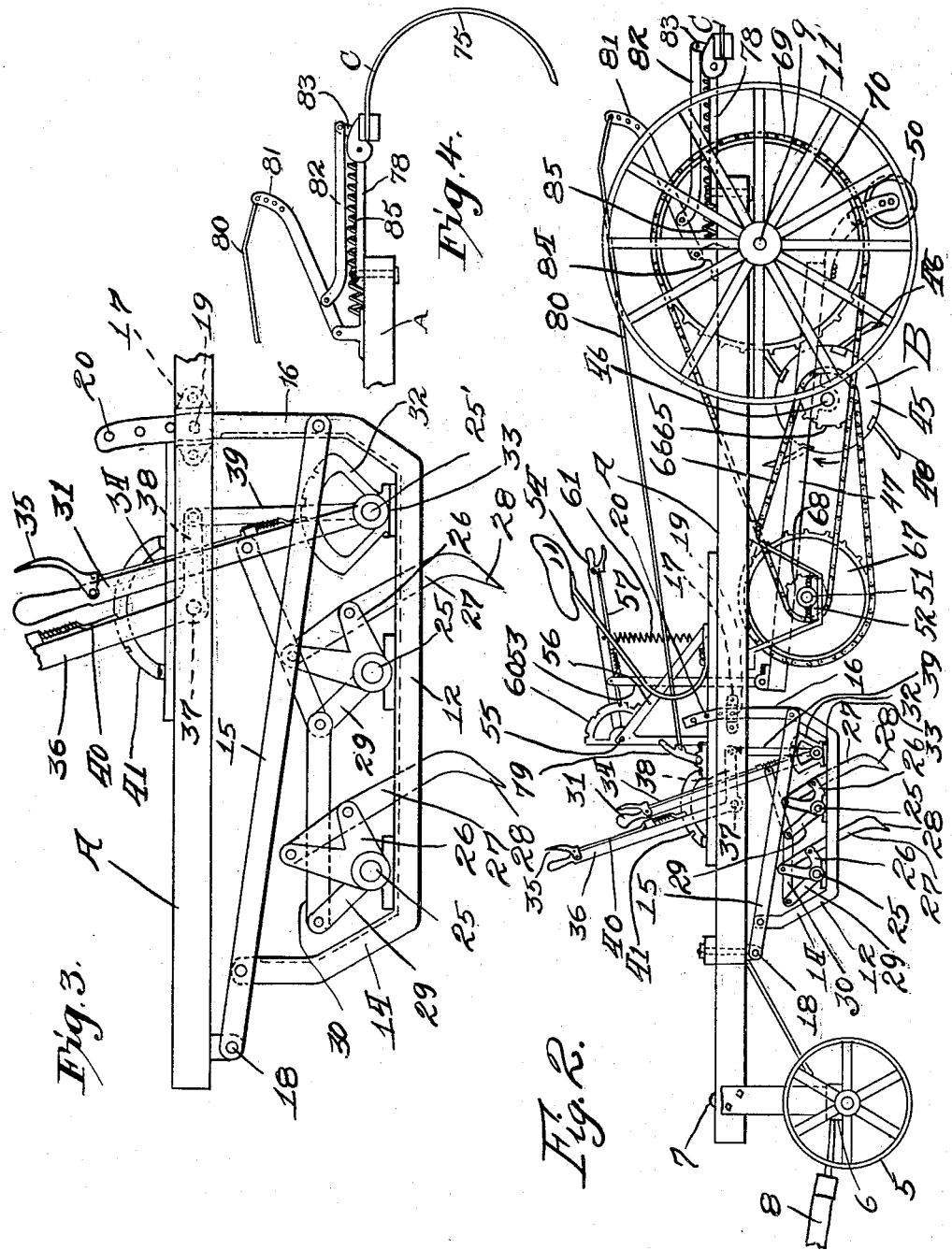

FRANK A. SIREK, OF LONSDALE, MINNESOTA.

QUACK-GRASS ERADICATOR.

1,197,866.  Specification of Letters Patent.  Patented Sept. 12, 1916.

Application filed March 12, 1914. Serial No. 824,151.

*To all whom it may concern:*

Be it known that I, FRANK A. SIREK, a citizen of the United States, residing at Lonsdale, in the county of Rice and State of Minnesota, have invented a new and useful Quack-Grass Eradicator, of which the following is a specification.

My invention relates to improvements in machines for digging and separating quack grass roots from the soil and gathering the roots so separated in readiness for removal from the field.

The primary object of this invention is the production of a machine of the class stated, which is simple and inexpensive in construction, and which will most effectively remove the quack grass roots from the soil, leaving the soil entirely cleared.

To these ends my invention comprises the features of construction and combination of parts hereinafter more particularly described and claimed.

In the accompanying drawings forming part of this specification, Figure 1 is a plan of my invention; Fig. 2 is a side elevation, Fig. 3 is a side view of a detail; and Fig. 4 is a fragmentary view of the rear end of the machine.

In the drawings, A designates a substantially horizontal main frame of rectangular shape having cross bars 2 and 3 and a longitudinal reach 4 secured thereto, which serve to brace and strengthen the structure. On the forward end of the reach are the steering wheels 5 journaled upon an axle 6, said axle being secured to the reach by means of a king pin 7 and serving to support the frame whereby the machine can be drawn and steered by horses attached to the draft rigging 8. The rear end of the frame is supported by a shaft 9 journaled in depending bearings 10 and mounted upon suitable carrying wheels 11, whereby the shaft 9 is revolved by the carrying wheels 11 as the vehicle is moved forwardly or backwardly.

Mounted upon the forward end of the frame is a tilting support composed of a pair of side members 12 and 13 having forward upturned ends 14 and rearward upturned ends 16 secured to carrier arms 15, said rearward upturned ends 16 passing through guides 17 on the sides of the main frame. The forward ends of the carrier arms 15 are hinged at 18 to the sides of the main frame and the rearward ends 16 of the side members 12 are adapted to slide in the guides 17 when the side members 12 and carrier arms 15 are tilted up and down. Pins 19 passing through the guides and openings 20 in the end parts 16 are adapted to hold said end parts 16 of the side members 12 in selected elevation. The side members 12 carry transverse shafts 25, which are journaled freely thereon, said shafts having secured thereto by bell crank levers 26 downwardly extending plow teeth 27 having forwardly directed sharp bladed lower ends 28, which are adapted to project downwardly and forwardly into the ground when in operation, to loosen the soil and most effectively free the quack grass roots. The plow teeth 27 are moved by the shafts into vertical or inclined position to best suit the conditions of the soil and the parts supporting the plow teeth are raised and lowered by tilting the parts constituting the plow teeth support. The shafts 25 are turned through the medium of lever arms 29 secured to the shafts and connected by links 30 with an operating lever 31. The lower end of this operating lever is journaled on the rearward shaft 25' adjacent to a toothed quadrant 32, said quadrant being mounted upon a cross plate 33, which is fastened to the side members 12 and 13. The operating lever 31 has a thrust lock shaft 34 operated by a handle 35 pivoted on said lever 31, said thrust shaft being adapted to engage in the notches in the quadrant to hold the parts with the plow teeth adjusted at any angle desired. The side members 12 and carrying arms 15 constituting part of the plow teeth support is tilted up and down by an operating lever 36, which is pivoted by its lower end at 37 on the reach 4, said lever 36 being connected by an arm 38 and link 39 to the rearward shaft 25', whereby as said lever 36 is swung on its pivot support, said support is raised and lowered, the rearward ends 16 of said support sliding in the guides 17 when the pins 19 are removed. When the pins 19 are inserted through the guides and openings 20, said support is locked in adjusted position, the operating member 36 serving to force the frame up or down, and only holding it in adjusted elevation temporarily by the lock pin 40 engaging in notches of the quadrant 41, which is secured to the reach.

Immediately back of the plow teeth 27 is a stripper B in the form of a cylindrical skeleton frame 45 having gudgeons 46 journaled in a freely disposed auxiliary frame 47. This stripper carries a plurality of forwardly slanting outwardly extending curved stripper teeth 48, which are revolved forwardly in the direction of the arrow illustrated in Fig. 2 at suitable speed to impinge downwardly in the coil as the vehicle moves ahead and is in operation, whereby the quack grass roots are entirely separated from the loosened soil and pitched backwardly on to the ground in front of a rake C, which follows the plow teeth. The auxiliary frame 47 is mounted upon a carrier wheel 50 trailing behind on the ground, and the forward end of said frame is hinged upon a transverse shaft 51, which in turn is journaled in the bearings 52 depending from the main frame A. A portion of the auxiliary frame 47 projects forwardly from the shaft 51, and is coupled by a link 53 to an operating handle lever 54, by which it is tilted up out of operation when desired. One end of the operating lever handle 54 is pivoted at 55 on a stand 56, which is carried by the reach, said link 53 being coupled to the lever 54 outwardly from the pivot point 55. A lock member 57 of usual construction is adapted to engage notches in a quadrant 60 carried by the stand 56 to hold the frame 47 in adjusted position. A tension spring 61 secured to the handle 54 and to the reach tends to draw the operating lever 54 down and assist in tilting the frame 47 with its rearward end upwardly, and the stripper out of engagement with the ground. Normally when the machine is in operation, the stripper teeth 48 depend lower than the lowermost portion of the carrier wheel 50.

The stripper B is revolved by the following mechanism: A sprocket wheel 65 is mounted on one of the gudgeons 46 and a chain belt 66 travels over said sprocket wheel and around another sprocket wheel 67, which is mounted upon the shaft 51. This shaft 51 carries another sprocket wheel 68 around which a drive chain belt 69 travels, said last mentioned belt passing over a large drive sprocket wheel 70, which is journaled on the main drive shaft 9 from which motion is derived. A clutch 71 interposed between the drive shaft 9 and the drive sprocket 70 transmits motion from the drive shaft when the clutch is engaged, thus imparting motion to the mechanism described. When the clutch is disconnected, motion is not transmitted to the stripper and the wheels 11 are free to revolve and perform their usual function of assisting in carrying the vehicle.

Immediately following the stripper and tiltingly mounted upon the rear end of the frame A is the rake C, said rake having down curved tines 75 mounted upon a cross member 76, which is secured to couplings 77. These couplings are pivoted upon rearward extensions 78 of the main frame. The rake is tilted upwardly or downwardly by a foot member 79, a reach rod 80, a tilting foot member 81 to which the reach rod is attached and a link 82 between the tilting foot member and a bracket 83 secured on a cross member 76 of the rake, said tilting foot member 81 being pivoted at its lower end to a bracket 84, which is mounted on the main frame. A draw spring 85 secured to the main frame and to the bracket 83 assists in raising the rake and the parts are so arranged that when the foot lever 79 is pressed forwardly past its pivot center and released, the rake is held in raised position.

In operation as the vehicle is moved forwardly the plow members 27 are adapted to loosen the soil and the quack grass roots in the soil. The stripper following the plow members engages and lifts the quack grass roots separating them entirely from the soil and passing the roots over the stripper and back on the ground in position to be caught by the rake. The rake gathers the quack grass roots and from time to time the rake is lifted by pressing the foot lever 79, leaving the quack grass roots piled in rows on the ground convenient for either removal or burning. The plow teeth from time to time are adjusted in angle of support and depth to most effectively loosen the ground and disengage all of the quack grass, the means of adjusting the angle of the teeth being independent of the adjustment of the depth at which the teeth are held whereby the teeth are most effectively supported to perform their function. This feature is important because without said independent adjustment, diversity of soil conditions would render the machine ineffective at times.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claim.

Having described my invention, what I claim as new and desire to protect by Letters Patent is:

A machine of the class set forth, comprising, in combination, a vehicle having a main frame, a plow having a plurality of teeth depending below said frame, and formed with forwardly extending sharpened ends, means for raising and lowering said teeth to vary the depth to which they are adapted to extend, said teeth being tiltingly mounted to vary their angle of inclination, means for tilting said teeth and holding them adjusted, said tilting means operating independent of said raising and lowering means, whereby the teeth can be adjusted in elevation and inclination to most effectively disengage and loosen the quack grass from the soil, a revoluble root-stripper at the rear of said plow having radiating teeth, an auxiliary frame pivotally supported by said main frame, and upon which said stripper is journaled, means for tilting said auxiliary frame to raise and lower said stripper whereby the stripper is adjustable in elevation independent of said plow teeth, a carrier wheel trailing behind said auxiliary frame and serving to limit the depth to which the teeth of said stripper extend into the ground, and a rake tiltingly mounted upon said main frame at the rear of said stripper.

FRANK A. SIREK.

Witnesses:
FRANCIS J. HANZEL,
R. M. V. HAVEL.

Copies of this patent may be obtained for five cents each, by addressing the "Commissioner of Patents, Washington, D. C."